Dec. 8, 1931.  W. W. WANZENBERG  1,835,734
SHOWER BATH
Filed Oct. 4, 1929
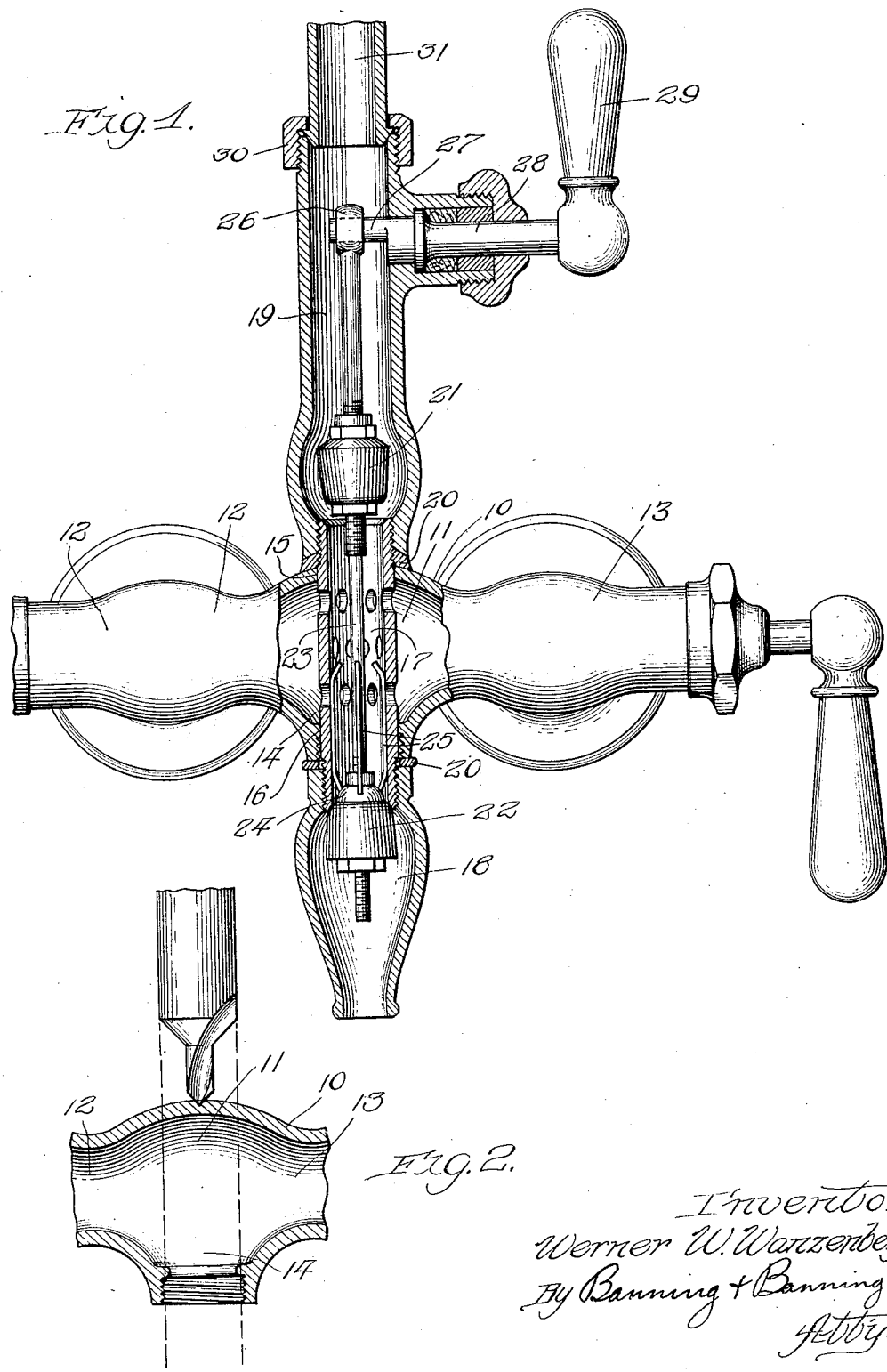
Inventor:
Werner W. Wanzenberg,
By Banning & Banning
Attys.

Patented Dec. 8, 1931

1,835,734

UNITED STATES PATENT OFFICE

WERNER W. WANZENBERG, OF EVANSTON, ILLINOIS

SHOWER BATH

Application filed October 4, 1929. Serial No. 397,315.

This invention relates to shower or needle baths, and has for its object the provision of a method and apparatus whereby bathroom faucets of conventional mixer or combination type may be readily adapted for use in connection with shower bath or other spray discharging devices.

A further object of the invention is to provide such a method and apparatus which will enable the faucet to be used in its original mode of operation while enabling the discharge to be diverted into the spray discharging devices at will.

Other objects, advantages and capabilities will later more fully appear.

My invention further resides in the combination, construction and arrangements of parts illustrated in the accompanying drawings, and while I have shown herein a preferred embodiment I wish the same to be understood as illustrative only and not limiting the scope of my invention.

In the drawings:

Figure 1 is an elevation partly in section, showing a device constructed according to my invention, and Fig. 2 is a detail showing the manner in which the faucet is drilled.

Referring to the drawings, the numeral 10 designates, generally, a combination or mixer faucet of conventional type. Said faucet comprises a central mixing chamber 11 which is supplied with hot and cold water by the conduits 12 and 13, said streams of water being controlled by the hot and cold water valves of the faucet in the usual manner. From the under side of the mixing chamber 11 opens a discharge outlet 14 which is sometimes provided with a removable discharge nozzle (not shown).

In constructing the device according to my invention, the removable nozzle of the faucet, if any, is removed and an opening is drilled through the cap of the mixing chamber 11 in alignment with the discharge opening 14, as shown in Fig. 2. After the wall of the mixing chamber 11 is perforated, the drilling is continued until the tool extends through the discharge opening 14 and has cut at least some of the metal thereround. Said drilling provides the top wall of the mixing chamber 11 with a cylindrical seat 15 and the discharge outlet 14 with a cylindrical seat 16, which seats are adapted to provide a tight fit for the perforated tube 17 which is inserted in the faucet as shown in Fig. 1. The perforated tube 17 is of such length that it can protrude at both ends from the mixing chamber 11.

The protruding ends of the tube 17 are threaded exteriorly. To the lower end is attached a discharge nozzle 18, and to the upper end is attached the tubular section 19. Suitable washers 20 are provided around the perforated tube 17 and between the nozzle 18 and section 19 and the faucet 10.

The upper and lower ends of the perforated tube 17 are adapted to serve as seats for valves 21 and 22, respectively. Said valves are mounted upon a rod 23, which is adapted to be moved longitudinally so as to close one end or the other of the tube 17, the valves 21 and 22 being suitably spaced upon the rod 23 for this purpose. The valves 21 and 22 may suitably be constituted by plugs of india rubber which are engaged between suitable collars rigidly mounted on the rod 23. For example, the rod 23 may be threaded throughout its length, or adjacent the locations of the valves 21 and 22, and the collars engaging said valves may be threaded upon said rod. Between the valve 22 and the upper collar associated therewith is preferably mounted a collar 24 which carries upwardly extending resilient fingers 25 which are adapted to engage the interior of the perforated tube 17 and prevent vibration or pounding during use.

The upper end of the rod 23 is provided with an eye 26 which is engaged by a pin 27 eccentrically carried by a stem 28 rotatably mounted in the section 19 and operable by a handle 29. The upper end of the pipe section 19 is threaded exteriorly and is united by means of a collar 30 to a pipe 31 which communicates with any suitable form of spraying device (not shown).

When the rod 23 is moved to its lowermost position by suitable operation of the handle 29, the valve 22 is removed from its seat, while the valve 21 is firmly applied upon its seat. In this condition of the parts the faucet can be used in its original manner, the hot water from the conduit 12 and cold water from the conduit 13 entering the mixing chamber 11 and passing therefrom through the perforated tube 17 into the discharge nozzle 18.

When the rod 23 is moved into its upper position by means of the handle 29, the valve 22 rests firmly upon its seat, while the valve 22 is removed from its seat. Consequently the water can no longer pass downwardly to the discharge nozzle 18 but is diverted upwardly through the pipe section 19 into the spray fixture connected thereto.

I claim:

1. In a shower bath device, a combination faucet provided with a mixing chamber, a perforated tube extending therethrough, a discharge nozzle on one end of said tube and a conduit on the other end of said tube, valves at either end of said tube, said valves being interconnected to close one end of said tube and leave the other open.

2. In a shower bath device, a combination faucet provided with a mixing chamber, a perforated tube extending therethrough, a discharge nozzle mounted on the lower end of said tube and a shower conduit mounted on the upper end of said tube, valves in said nozzle and shower conduit mounted on a rod extending through said tube and adapted to close either end of said tube, and means on the exterior of said device for actuating said rod.

3. In a shower bath device, a combination faucet provided with a mixing chamber, a perforated tube extending therethrough, a discharge conduit connected to each end of said tube and bearing against said faucet, a valve in each discharge conduit adapted to close the ends of said tube, a rod extending through said tube carrying said valves, a member eccentrically mounted in one of said discharge conduits and adapted to co-operate with said rod to move same longitudinally to close either of said valves, and an exterior handle adapted to rotate said member.

4. In combination, a mixer faucet comprising a central chamber adapted to be supplied with regulable streams of cold and hot water, said chamber being provided with a discharge opening and an opening opposed thereto, a perforated tube extending through said openings, means engaging the ends of said tube forming tight joint with the faucet body, and valves adapted to close the ends of said tube.

5. In combination, a mixer faucet comprising a central chamber adapted to be supplied with regulable streams of cold and hot water, said chamber being provided with a discharge opening and an opening opposed thereto, a perforated tube extending through said openings, means engaging the ends of said tube forming a tight joint with the faucet body, valves mounted on a rod extending through said tube and adapted to close either of the ends of said tube, and means for moving said rod longitudinally.

6. In combination, a mixer faucet comprising a central chamber adapted to be supplied with regulable streams of cold and hot water, said chamber being provided with a discharge opening and an opening of the same diameter opposed thereto, a perforated tube extending through said openings, means engaging the ends of said tube forming a tight joint with the faucet body and valves rigidly connected together adapted to close the ends of said tube.

7. In a shower bath device, a combination faucet provided with a mixing chamber, a perforated tube extending therethrough, a discharge nozzle on one end of said tube and a conduit on the other end of said tube, valves at either end of said tube, said valves being interconnected to close one end of said tube and leave the other open, and resilient means associated with a valve engaging said tube to prevent vibration of said valve.

8. In combination, a mixer faucet comprising a central chamber adapted to be supplied with regulable streams of cold and hot water, said chamber being provided with a discharge opening and an opening opposed thereto, a perforated tube extending through said openings, means engaging the ends of said tube forming a tight joint with the faucet body, valves mounted on a rod extending through said tube and adapted to close either of the ends of said tube, means connected to one end of the rod for moving same longitudinally, and resilient means at the other end of said rod engaging the interior of said tube.

9. In combination, a faucet chamber provided with a pair of openings, a tube in said chamber projecting from said openings, a valve rod extending through said tube, valves thereon beyond the ends of said tube and adapted to close the ends of said tube means for supporting one end of said rod, and spring means mounted on said rod remote from said supporting means and extending into said tube.

In testimony whereof, I have hereunto set my hand and affixed my seal this 26th day of September, 1929.

WERNER W. WANZENBERG.